(12) United States Patent
Scholl et al.

(10) Patent No.: US 6,518,369 B2
(45) Date of Patent: Feb. 11, 2003

(54) RUBBER MIXES CONTAINING POLYETHER/DIOLEFIN RUBBERS AND USE THEREOF IN PARTICULAR FOR THE PRODUCTION OF TIRES WITH LOW ROLLING RESISTANCE

(75) Inventors: Thomas Scholl, deceased, late of Bergisch (DE), by Ulrike, Philipp, Christine, Johannes Scholl, heirs; Werner Obrecht, Moers (DE); Wilfried Braubach, Solingen (DE); Ellen Giebeler, Köln (DE); Michael Grün, Siegburg (DE); Axel Müller, Wiesbaden (DE); Mabel Graf, Rehau (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/993,115

(22) Filed: Nov. 14, 2001

(65) Prior Publication Data

US 2002/0132926 A1 Sep. 19, 2002

(30) Foreign Application Priority Data

Nov. 21, 2000 (DE) .......................................... 100 57 508

(51) Int. Cl.[7] .......................... C08L 71/02; C08C 19/12; C08K 3/34
(52) U.S. Cl. ................. 525/359.3; 525/359.2; 525/162; 525/118; 525/98; 525/88
(58) Field of Search .......................... 525/359.3, 359.2, 525/162, 118, 98, 88

(56) References Cited

U.S. PATENT DOCUMENTS

| | | | | |
|---|---|---|---|---|
| 2,682,531 A | | 6/1954 | Ernst et al. ................ | 260/85.3 |
| 5,780,540 A | * | 7/1998 | Barndes et al. | |
| 6,015,841 A | | 1/2000 | Langstein et al. ............ | 522/29 |
| 6,147,164 A | * | 11/2000 | Hsu et al. | |
| 2001/0031822 A1 | | 10/2001 | Scholl et al. ................ | 524/493 |
| 2001/0036991 A1 | | 11/2001 | Robert et al. ................ | 524/492 |

FOREIGN PATENT DOCUMENTS

EP  0 894 824  2/1999

OTHER PUBLICATIONS

Patent Abstracts of Japan, vol. 009, No. 278 (C–312), Nov. 6, 1985 & JP 60 124637 A (Yokohama Gomu KK), 3. Juli '985 (Jul. 3, 1985) Zusammenfassung.
Patent Abstracts of Japan, vol. 2000, No. 07, Sep. 29, 2000 & JP 2000 109675 A Nippon Zeon Co Ltd),k Apr. 18, 2000 Zusammenfassung.
Patent Abstracts of Japan vol. 011, No. 075 (C–408), 6. März 1987 (Mar. 6, 1987) & JP 61 231013 A (Japan Synthetic Rubber Co Ltd), 15. Oktober 1986 (Oct. 15, 1986) Zusammenfassung.
Patent Abstracts of Japan vol. 011, No. 075 (C–408), 6. März 1987 (Mar. 6, 1987) & JP 61 231016 A (Japan Synthetic Rubber Co Ltd; Others: 01), 15. Oktober 1986 (Oct. 15, 1986) Zusammenfassung.
Ullmann's Encyclopedia of Industrial Chemistry, vol. A23, (month unavailable) 1993, pp. 288–295, Rubber, 3. Synthetic.
Meeting of the Rubber division, ACS, Cleveland, Ohio May 6–9 1975, W.A.Thaler and D.J. Buckley, Sr., High–Molecular–Weight, High–Unsaturation Copolymers of Isobutylene and Conjugated Dienes. I. Synthesis, published in Rubber Chemistry and Technology 49, pp. 960–966 (month unavailable) 1976.

* cited by examiner

*Primary Examiner*—James J. Seidleck
*Assistant Examiner*—Olga Asinovsky
(74) *Attorney, Agent, or Firm*—Joseph C. Gil; Jennifer R. Seng; Noland J. Cheung

(57) ABSTRACT

The present invention relates to filled rubber mixes made from polyether/diolefin rubbers. The rubber mixes according to the present invention are suitable for the production of highly reinforced, abrasion-resistant moldings, in particular for the production of tires which exhibit low rolling resistance and elevated wet skid resistance.

8 Claims, No Drawings

RUBBER MIXES CONTAINING POLYETHER/DIOLEFIN RUBBERS AND USE THEREOF IN PARTICULAR FOR THE PRODUCTION OF TIRES WITH LOW ROLLING RESISTANCE

FIELD OF THE INVENTION

The present invention relates to filled rubber mixes made from special rubbers based on polyethers and diolefins and optionally vinyl aromatics. The rubber mixes according to the present invention are suitable for the production of highly reinforced, abrasion-resistant moldings, in particular, for the production of tires which exhibit low rolling resistance and elevated wet skid resistance.

BACKGROUND OF THE INVENTION

Anionically polymerized solution rubbers containing double bonds, such as solution polybutadiene and solution styrene/butadiene rubbers, have advantages over corresponding emulsion rubbers in the production of tire treads with low rolling resistance. The advantages reside inter alia in the controllability of the vinyl content and thus, of glass transition temperature and molecular branching, which are associated therewith. In practice, this gives rise to particular advantages with regard to the tire's relationship of wet skid resistance to rolling resistance. Accordingly, U.S. Pat. No. 5,227,425 describes the production of tire treads from a solution SBR rubber and silica. In order to achieve a further improvement in properties, numerous methods have been developed for modifying end groups, as described in EP-A 334 042, with dimethylaminopropylacrylamide, or, as described in EP-A 447 066, with silyl ethers. However, due to the elevated molecular weight of the rubbers, the content by weight of the end group is low and is thus, able to have only a slight influence upon the interaction between the filler and the rubber molecule. The object of the present invention was to provide solution rubbers having a higher content by weight of effective polar groups.

U.S. Pat. No. 3,360,571 describes a process for the production of polyether/diolefin block polymers by anionic solution polymerization of a diolefin and further reaction of the living polymer anion with ethylene oxide. The use of ethylene oxide entails elaborate processing technology. The listed polyethylene oxide/diolefin block copolymers moreover have low molecular weights (500 to 50,000) and are primarily intended for coatings.

U.S. Pat. No. 3,419,505 describes a process for the production of ethylene oxide/diolefin copolymers, wherein polymerization is performed in the presence of iron, aluminum and phosphorus catalysts. The process has the disadvantage that large quantities of catalysts containing iron are required, the presence of which is undesirable in the finished rubber, because iron compounds have a negative impact upon ageing characteristics. The cited document makes no reference to the use of the rubbers in low-damping tires.

German patent application no. 100 099 092 describes rubbers with polyether side groups. These rubbers differ with regard to their chemical structure from the rubbers of the present invention. The polyether side groups in the cited application are attached as side groups to the polymer chain via sulfur atoms, whereas in the present invention they act as a binding link in the polymer chain.

SUMMARY OF THE INVENTION

Accordingly, the object of the present invention is to provide rubber mixes made from special, anionically polymerized polyether/diolefin block polymers together with a simple production process, from which polymers it is possible to produce tires having improved wet skid resistance, lower rolling resistance together with elevated mechanical strength and improved abrasion behavior.

DETAILED DESCRIPTION OF THE INVENTION

Accordingly, the present invention provides rubber mixes made from polyether/diolefin rubbers, which have a content of diolefin incorporated by polymerization of 49.99 to 99.99 wt. %, preferably of 60 to 99.9 wt. %, a content of vinyl aromatic compounds of 0 to 50 wt. %, preferably of 0 to 40 wt. %, and a content of polyether incorporated into the polymer chain of 0.01 to 5 wt. %, preferably of 0.1 to 2 wt. %, wherein the percentages add up to 100 wt. %, and 10 to 500 parts by weight, preferably 20 to 150 parts by weight of filler, relative to 100 parts by weight of rubber.

The rubber mixes according to the present invention may, of course, also contain further rubbers, rubber auxiliaries and vulcanizing agents, which are described below in greater detail.

The polyether/diolefin rubbers used according to the present invention in the rubber mixes are produced by reacting a living polymer anion, which has been obtained by polymerizing at least one diolefin and optionally vinyl aromatic compounds with an anionic initiator, with a reactive polyether of the general formula

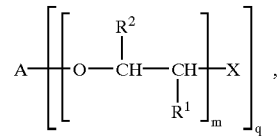

in which
A denotes a mono- to tetravalent $C_1$–$C_{24}$ alkyl residue, a mono- to trivalent $C_6$–$C_{24}$ aryl residue or a mono- to trivalent $C_7$–$C_{24}$ alkylaryl residue,
$R^1$ and $R^2$ mutually independently mean hydrogen or a methyl, ethyl, propyl or butyl group and
X denotes a halogen atom or a group from the range —O—$C_1$-$C_{24}$-alkyl, —O—$C_6$-$C_{24}$-aryl or —O—$C_7$-$C_{24}$-alkylaryl, providing that at least one residue X denotes a halogen atom,
m denotes an integer from 4 to 30, preferably from 5 to 20, and
q denotes an integer from 1 to 4, preferably from 1 to 3, most preferably 2,
at temperatures in the range from −100 to +150° C.

"A" preferably denotes a methyl, ethyl, propyl, butyl or phenyl group or a difunctional residue from the range —$CH_2CH_2$, —$CH_2CH_2CH_2$—, —$CH_2C(CH_3)$— or a trifunctional $CH_3CH_2$—$C(CH_2)_3$ residue or a tetrafunctional residue $C(CH_2)_4$. More preferred residues A are the methyl residue and the following difunctional groups: —$CH_2CH_2$—, —$CH_2CH_2CH_2$—, $CH_2C(CH_3)$—, $R^1$ and $R^2$ preferably denote H or methyl, more preferably H and X preferably denotes chlorine.

Preferred diolefins for the production of the polyether/diolefin rubbers are 1,3-butadiene, isoprene, 1,3-pentadiene, 2,3-dimethylbutadiene, 1-vinyl-1,3-butadiene and/or 1,3-hexadiene. 1,3-Butadiene and isoprene are more preferably used.

Vinyl aromatic monomers usable for the production of the polyether/diolefin rubbers which may be mentioned by way of example are styrene, o-, m- and p-methylstyrene, p-tert.-butylstyrene, α-methylstyrene, vinyinaphthalene, diphenylethylene, divinylbenzene, trivinylbenzene and/or divinylnaphthalene. Styrene is more preferably used.

Preferred reactive polyethers are chlorine-terminated polyethylene oxides and chlorine-terminated polyethylene oxide/propylene oxide copolyethers having molecular weights in the range from 400 to 2500. Linear, α,ω-chlorine-terminated polyethylene oxides having (number average) molecular weights of 450 to 1800 are more preferred.

The polyether/diolefin rubbers have average molecular weights (number average) of 100,000 to 2,000,000, preferably of 150,000 to 1,500,000, and glass transition temperatures of −100° to +20° C., preferably of −95° C. to 0° C., and Mooney viscosities ML 1+4 (100° C.) of 10 to 200, preferably of 30 to 150.

Anionic polymerization of the stated starting monomers preferably proceeds by means of an alkali metal-based catalyst, for example n-butyllithium, in an inert hydrocarbon as solvent. Known randomizers and control agents for developing the microstructure of the polymer may additionally be used. Such anionic solution polymerizations are known and are described, for example, in 1. Franta, *Elastomers & Rubber Compounding Materials*; Elsevier 1989, pp. 73–74, 92–94 and in Houben-Weyl, *Methoden der Organischen Chemie*, Thieme Verlag, Stuttgart, 1987, volume E20, pp. 114–134.

Examples of suitable alkali metal catalysts are lithium, sodium, potassium, rubidium, caesium metal and the hydrocarbon compounds thereof and complex compounds thereof with polar organic compounds.

Lithium and sodium hydrocarbon compounds having 2 to 20 carbon atoms are particularly preferably used, for example ethyllithium, n-propyllithium, i-propyllithium, n-butyllithium, sec.-butyllithium, tert.-octyllithium, n-decyllithium, phenyllithium, 2-naphthyllithium, 2-butylphenyllithium, cyclohexyllithium, 4-cyclopentyllithium, 1,4-dilithio-2-butene, sodium naphthalene, sodium biphenyl, potassium/tetrahydrofuran complex, potassium/diethoxyethane complex, sodium/tetramethylethylenediamine complex. The catalysts may be used alone and as a mixture.

Preferred catalyst quantities are 0.5 to 10 mmol/100 g of polymer.

Anionic solution polymerization is performed in a hydrocarbon or in another solvent which does not destroy the catalyst, for example, in tetrahydrofuran, tetrahydropyran or 1,4-dioxane. Hydrocarbons suitable as solvents are, for example, aliphatic, cycloaliphatic or aromatic hydrocarbons having 2 to 12 carbon atoms. Preferred solvents are propane, butane, pentane, hexane, cyclohexane, propene, butene, 1-pentene, 2-pentene, 1-hexene, 2-hexene, benzene, toluene, xylene. The solvents may be used alone or as a mixture.

The reaction of the living polymer anion with the reactive polyether is preferably performed in the same solvent at temperatures of −40 to +120° C. The reactive polyether may here optionally also be introduced in excess.

The polyethers to be used may be produced using per se known methods, for example by reacting the corresponding hydroxyl polyethers with thionyl chloride with elimination of hydrogen chloride and sulfur dioxide, preferably in the presence of amine catalysts at temperatures of approx. 40 to 120° C. Production may proceed in inert solvents, such as hydrocarbons, or also in the absence of solvent. Production preferably proceeds without solvent. Such reactions are described, for example, in Houben-Weyl, *Methoden der Organischen Chemie*, Thieme Verlag, Stuttgart 1962, volume V/3, pp. 862–870.

The rubber mixes according to the present invention are produced by mixing the polyether/diolefin rubbers with fillers.

Fillers which may be considered for the rubber mixes according to the present invention are any known fillers used in the rubber industry, such fillers comprising both active and inactive fillers.

The following may be mentioned:

highly dispersed silicas, for example, produced by precipitating solutions of silicates or by flame hydrolysis of silicon halides, having specific surface areas of 5–1000, preferably of 20–400 $m^2/g$ (BET surface area) and primary particle sizes of 10–400 nm. The silicas may optionally also assume the form of mixed oxides with other metal oxides, such as Al, Mg, Ca, Ba, Zn, Zr, Ti oxides;

synthetic silicates such as aluminum silicate, alkaline earth metal silicate, such as magnesium silicate or calcium silicate, having BET surface areas of 20–400 $m^2/g$ and primary particle diameters of 10–400 nm;

natural silicates, such as kaolin and other naturally occurring silicas;

glass fibers and glass fiber products (mats, strands) or glass microbeads;

metal oxides, such as zinc oxide, calcium oxide, magnesium oxide, aluminum oxide;

metal carbonates, such as magnesium carbonate, calcium carbonate, zinc carbonate;

metal hydroxides, such as for example aluminum hydroxide, magnesium hydroxide;

carbon blacks. The carbon blacks to be used in this case are produced by the lampblack, furnace black or gas black processes and have BET surface areas of 20–200 $m^2/g$, for example SAF, ISAF, HAF, FEF or GPF carbon blacks.

Highly dispersed silicas and/or carbon blacks are preferably used as fillers.

The stated fillers may be used alone or as a mixture. In a preferred embodiment, the rubber mixes contain a mixture of light fillers, such as highly dispersed silicas, and carbon blacks as the fillers, wherein the mixture ratio of light fillers to carbon blacks is 0.05–20, preferably 0.1–10.

Apart from the polyether/diolefin rubbers, the rubber mixes according to the present invention may also contain further rubbers, such as natural rubber as well as other synthetic rubbers.

Preferred synthetic rubbers are described, for example, in W. Hofmann, *Kautschuktechnologie*, Gentner Verlag, Stuttgart 1980 and I. Franta, *Elastomers & Rubber Compounding Materials*, Elsevier, Amsterdam 1989. These include inter alia BR—polybutadiene ABR—butadiene/acrylic acid $C_1$–$C_4$-alkyl ester copolymers CR—polychloroprene IR—polyisoprene SBR—styrene/butadiene copolymers with styrene contents of 1–60, preferably 20–50 wt. %

IIR—isobutylene/isoprene copolymers

NBR—butadiene/acrylonitrile copolymers having acrylonitrile contents of 5–60, preferably 10–40 wt. %

HNBR—partially hydrogenated or completely hydrogenated NBR rubber

EPDM—ethylene/propylene/diene copolymers and mixtures of these rubbers. Rubbers, which are of interest for the production of motor vehicle tires, are in particular natural rubber, emulsion SBR and solution SBR rubbers having a glass transition temperature of above −50° C., which may optionally be modified according to EP-A 447 066 with silyl ethers or other functional groups, polybutadiene rubber having an elevated 1,4-cis content (>90%), which has been produced with catalysts based on Ni, Co, Ti or Nd, as well as polybutadiene rubber with a vinyl content of up to 75%, and mixtures thereof.

The rubber mixes according to the present invention may, of course, also contain further rubber auxiliaries, which for example serve to vulcanize the rubber mixes or which improve the physical properties of the vulcanizates produced from the rubber mixes according to the present invention with regard to their specific intended application.

Vulcanizing agents which may be used are, for example, sulfur or sulfur-releasing compounds, together with free radical-releasing vulcanizing agents, such as organic peroxides. Sulfur is preferably used as the vulcanizing agent. As mentioned, the rubber mixes according to the present invention may furthermore, contain additional auxiliaries, such as known reaction accelerators, antioxidants, heat stabilizers, light stabilizers, antiozonants, processing auxiliaries, plasticizers, tackifiers, blowing agents, dyes, pigments, waxes, extenders, organic acids, retarders, metal oxides and activators.

The rubber auxiliaries according to the present invention are used in conventional, known quantities, wherein the quantity used is dependent upon the subsequent intended use of the rubber mixes. Conventional quantities of rubber auxiliaries are, for example, in the range from 2 to 70 parts by weight, relative to 100 parts by weight of rubber, or 0.1 to 5 parts by weight for the vulcanizing agents.

As mentioned above, additional rubbers may also be incorporated into the rubber mixes according to the present invention. The quantity thereof, is conventionally in the range from 0.5 to 70, preferably from 10 to 50 wt. %, relative to the entire quantity of rubber in the rubber mix. The quantity of additionally added rubbers is again dependent upon the particular intended application of the rubber mixes according to the present invention.

It is particularly advantageous to use additional filler activators for the rubber mixes according to the present invention which are filled, for example, with highly active silicas. Preferred filler activators are silyl ethers containing sulfur, in particular bis(trialkoxysilylalkyl)polysulfides, as are described in DE-A 2,141,159 and DE-A 2,255,577. Oligomeric and/or polymeric silyl ethers containing sulfur as described in DE-A 4,435,311 and EP-A 670 347 may furthermore be considered. Mercaptoalkyltrialkoxysilanes, in particular mercaptopropyltriethoxysilane and thiocyanatoalkylsilyl ethers (c.f. DE-A 19,544,469) may also be used. Filler activators are used in conventional quantities, i.e. in quantities of 0.1 to 15 parts by weight, relative to 100 parts by weight of rubber.

The rubber mixes according to the present invention may be produced, for example, by blending the polyether/diolefin rubbers and optionally, further rubbers with the appropriate fillers and rubber auxiliaries in suitable mixing apparatus, such as kneaders, roll mills or extruders.

The present invention also provides the use of the rubber mixes according to the present invention for the production of vulcanizates, which are, in turn, used for the production of highly reinforced rubber moldings, in particular, for the production of tires or tire components, such as tire treads.

The tires are distinguished by particularly good damping behavior (low-damping) and by low rolling resistance and elevated wet skid resistance.

The invention is further illustrated but is not intended to be limited by the following examples in which all parts and percentages are by weight unless otherwise specified.

EXAMPLES

Example 1

α,ω-Dichloropolyethylene Glycol Ether with a Molecular Weight of 900

A mixture of 450 g of a polyethylene glycol ether with a molecular weight of 900 and 0.5 g of pyridine was combined with 119 g of thionyl chloride at 60° C., wherein sulfur dioxide and hydrogen chloride were liberated. The mixture was then stirred for 17 hours at 70° C. and hydrogen chloride residues were removed under a high vacuum. 454 g of a colorless oil were obtained which slowly crystallized when left to stand at room temperature.

Elemental Analysis:

|  | C | H | Cl |
|---|---|---|---|
| calculated: | 51.1 wt. % | 8.52 wt.% | 7.04 wt. % |
| actual: | 51.3 wt. % | 8.5 wt.% | 7.4 wt. % |

Example 2

272 mg of sec-BuLi (3.32 ml of a 1.3 molar solution in hexane) in 5270 g (8000 ml) of n-hexane were initially introduced at 20° C. into a temperature-controllable stirred autoclave and then combined with 500 g of butadiene. As soon as the butadiene had been added, the autoclave was adjusted to 50° C. and an $N_2$ overpressure of approx. 1.5 bar established. Polymerization was then performed for 8 h at 50° C.

The autoclave was then cooled to −25° C. During cooling, 4.08 g of diphenylethylene were added. At −25° C., 887 g (1000 ml) of THF were added. 2.34 g of polyether from Example 1 were immediately then added. After 6 h, the solution was heated to 20° C., combined with approx. 3 g of 2,6-di-tert.-butyl-4-methylphenol and the polymer precipitated in 40 L of isopropanol. The polymer was vacuum dried at room temperature.

TABLE 1

| 1,4 content (wt. %) | 1,2 content (wt. %) | Polyether content (wt. %) | Tg (° C.) | Mooney viscosity (ML 1 + 4, 100° C.) | Molecular weight (GPC, g/mol) |
|---|---|---|---|---|---|
| 92 | 7.8 | 0.2 | −92 | 50 | 283,000 |

Example 3

The following rubber mixes were produced at 130° C. in a 1.5 L kneader. Sulfur and accelerator were finally incorporated at 50° C. in a roll mill.

TABLE 2

| | Comparative Example | Example according to the present invention |
|---|---|---|
| Mixed in kneader: | | |
| Solution SBR, Buna VSL 5025-1 (Bayer AG) | 61.9 | 61.9 |
| Polybutadiene rubber, Buna CB 45 NF (Bayer AG) | 45 | 0 |
| Rubber according to Example 2 | 0 | 45 |
| Precipitated silica, Vulkasil S (Bayer AG) | 70 | 70 |
| Carbon black, Corax N 121 (Degussa) | 10 | 10 |
| Aromatic plasticizer, Enerthene 1849-1 (BP) | 20 | 20 |
| Zinc oxide | 3 | 3 |
| Stearic acid | 1 | 1 |
| Antioxidant, Vulkanox 4020 (Bayer AG) | 1 | 1 |
| Antioxidant, Vulkanox HS (Bayer AG) | 1 | 1 |
| Antiozonant wax, Antilux 654 (Rheinchemie) | 1.5 | 1.5 |
| Silane, Si 69 (Degussa) | 6 | 6 |
| Incorporated in roll mill (50° C.): | | |
| Sulfur | 1.5 | 1.5 |
| N-cyclohexylmercaptobenzo-thiazolesulfenamide, Vulkacit CZ (Bayer AG) | 1.8 | 1.8 |
| Diphenylguanidine, Vulkacit D (Bayer AG) | 2 | 2 |

Properties of Mix:

TABLE 3

| | | |
|---|---|---|
| Mooney viscosity ML 1 + 4 (100° C.) | 114 | 61 |
| Vulcanization kinetics (MDR) at 170° C. | | |
| Time to 10% of final torque value (minutes) | 0.6 | 1.2 |
| Time to 90% of final torque value (minutes) | 10.9 | 5.7 |

The rubber mixes were then vulcanized for 20 minutes at 170° C.

Properties of Vulcanizate:

TABLE 4

| | | |
|---|---|---|
| Modulus at 300% elongation (Mpa) | 8.5 | 10.4 |
| Tensile strength (MPa) | 15.6 | 16.2 |
| Elongation at break (%) | 470 | 415 |
| Hardness at 23° C. (Shore A) | 69 | 67 |
| Rebound elasticity at 23° C. (%) | 37 | 38 |
| Rebound elasticity at 70° C. (%) | 51 | 54 |
| tan delta at 0° C. | 0.295 | 0.332 |
| tan delta at 60° C. | 0.141 | 0.138 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber mixes containing polyether/diolefin rubbers and 10 to 500 parts by weight of filler, relative to 100 parts by weight of rubber, wherein the polyether/diolefin rubber is prepared by reacting a living polymer anion with a reactive polyether of the general formula

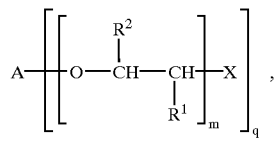

in which
A denotes a mono- to tetravalent $C_1$–$C_{24}$ alkyl residue, a mono- to trivalent $C_6$–$C_{24}$ aryl residue or a mono- to trivalent $C_7$–$C_{24}$ alkylaryl residue,
$R^1$ and $R^2$ mutually independently are hydrogen or a methyl, ethyl, propyl or butyl group and
X denotes a halogen atom or a group from the range —O—$C_1$–$C_{24}$-alkyl, —O—$C_6$–$C_{24}$-aryl or —O—$C_7$–$C_{24}$-alkylaryl, providing that at least one residue X denotes a halogen atom,
m denotes an integer from 4 to 30 and
q denotes an integer from 1 to 4,
wherein the living polymer anion is obtained by polymerizing at least one diolefin and optionally vinyl aromatic compounds with an anionic initiator and wherein the content of diolefin incorporated by polymerization is about 49.99 to 99.99 wt. %, the content of vinyl aromatic compounds is about 0 to 50 wt. % and the content of polyether incorporated into the polymer chain is about 0.01 to 5 wt. %, wherein the percentages add up to 100 wt. %.

2. Rubber mixes according to claim 1, comprising further rubbers, rubber auxiliaries and vulcanizing agents.

3. Rubber mixes according to claim 1, wherein said polyether/diolefin rubbers are produced by reacting a living polymer anion, which has been obtained by polymerizing at least one diolefin and optionally vinyl aromatic compounds with an anionic initiator, with a reactive polyether of the general formula

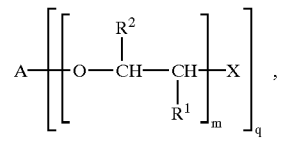

in which
A denotes a mono- to tetravalent $C_1$–$C_{24}$ alkyl residue, a mono- to trivalent $C_6$–$C_{24}$ aryl residue or a mono- to trivalent $C_7$–$C_{24}$ alkylaryl residue,
$R^1$ and $R^2$ mutually independently are hydrogen or a methyl, ethyl, propyl or butyl group and
X denotes a halogen atom or a group from the range —O—$C_1$–$C_{24}$-alkyl, —O—$C_6$–$C_{24}$-aryl or —O—$C_7$–$C_{24}$-alkylaryl, providing that at least one residue X denotes a halogen atom,
m denotes an integer from 4 to 30 and
q denotes an integer from 1 to 4,
at temperatures in the range from −100 to +150° C.

4. A process for producing polyether/diolefin rubbers comprising the step of reacting a living polymer anion, which has been obtained by polymerizing at least one diolefin and optionally vinyl aromatic compounds with an anionic initiator, with a reactive polyether of the general formula

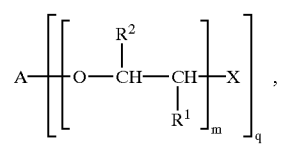

in which
A denotes a mono- to tetravalent $C_1$–$C_{24}$ alkyl residue, a mono- to trivalent $C_6$–$C_{24}$ aryl residue or a mono- to trivalent $C_7$–$C_{24}$ alkylaryl residue, R¹ and R² mutually independently are hydrogen or a methyl, ethyl, propyl or butyl group and X denotes a halogen atom or a group from the range —O—$C_1$-$C_{24}$-alkyl, —O—$C_6$-$C_{24}$-aryl or —O—$C_7$-$C_{24}$-alkylaryl, providing that at least one residue X denotes a halogen atom, m denotes an integer from 4 to 30 and q denotes an integer from 1 to 4, at temperatures in the range from −100 to +150° C.

5. Rubber moldings comprising rubber mixes containing polyether/diolefin rubbers and 10 to 500 parts by weight of filler, relative to 100 parts by weight of rubber, wherein the polyether/diolefin rubber is prepared by reacting a living polymer anion with a reactive polyether of the general formula

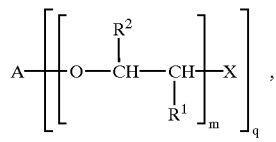

in which

A denotes a mono- to tetravalent $C_1$–$C_{24}$ alkyl residue, a mono- to trivalent $C_6$–$C_{24}$ aryl residue or a mono- to trivalent $C_7$–$C_{24}$ alkylaryl residue, R¹ and R² mutually independently are hydrogen or a methyl, ethyl, propyl or butyl group and X denotes a halogen atom or a group from the range —O—$C_1$-$C_{24}$-alkyl, —O—$C_6$-$C_{24}$-aryl or —O—$C_7$-$C_{24}$-alkylaryl, providing that at least one residue X denotes a halogen atom, m denotes an integer from 4 to 30 and q denotes an integer from 1 to 4, wherein the living polymer anion is obtained by polymerizing at least one diolefin and optionally vinyl aromatic compounds with an anionic initiator and wherein the content of diolefin incorporated by polymerization is about 49.99 to 99.99 wt. %, the content of vinyl aromatic compounds is about 0 to 50 wt. % and the content of polyether incorporated into the polymer chain is about 0.01 to 5 wt. %, wherein the percentages add up to 100 wt. %.

6. Rubber moldings according to claim 5, comprising further rubbers, rubber auxiliaries and vulcanizing agents.

7. Rubber moldings according to claim 6, wherein said polyether/diolefin rubbers are produced by reacting a living polymer anion, which has been obtained by polymerizing at least one diolefin and optionally vinyl aromatic compounds with an anionic initiator, with a reactive polyether of the general formula

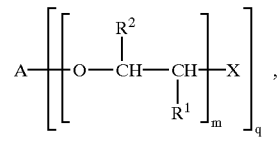

in which

A denotes a mono- to tetravalent $C_1$–$C_{24}$ alkyl residue, a mono- to trivalent $C_6$–$C_{24}$ aryl residue or a mono- to trivalent $C_7$–$C_{24}$ alkylaryl residue, R¹ and R² mutually independently are hydrogen or a methyl, ethyl, propyl or butyl group and X denotes a halogen atom or a group from the range —O—$C_1$-$C_{24}$-alkyl, —O—$C_6$-$C_{24}$-aryl or —O—$C_7$-$C_{24}$-alkylaryl, providing that at least one residue X denotes a halogen atom, m denotes an integer from 4 to 30 and q denotes an integer from 1 to 4, at temperatures in the range from −100 to +150° C.

8. Rubber moldings according to claim 5, wherein said rubber moldings are low-damping tires and tire treads.

* * * * *